Patented Oct. 30, 1934

1,979,144

UNITED STATES PATENT OFFICE

1,979,144

PRODUCTION OF POLYNAPHTHYL ETHERS

Miles A. Dahlen and Crayton K. Black, Wilmington, Del., and William L. Foohey, Pennsgrove, N. J., assignors to E. I. du Pont de Nemours & Company, Wilmington, Del., a corporation of Delaware No Drawing. Application July 14, 1933, Serial No. 680,500

14 Claims. (Cl. 260—150)

This invention relates to polynaphthyl ethers, and more particularly to naphthyl ethers of polyhydric alcohols or ether alcohols of the general formula:

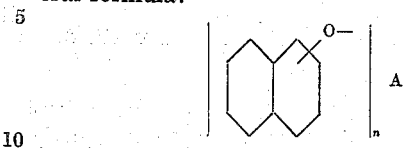

in which A represents a radical derived from an aliphatic hydrocarbon or hydrocarbon ether, and $n$ represents an integer larger than one.

The synthesis of ethers having the foregoing general formula has been effected by the condensation of metallic salts of naphthols with suitable halogenated aliphatic hydrocarbons or aliphatic hydrocarbon ethers in the presence of an organic solvent such as ethyl alcohol. One such procedure involves dissolving sodium in absolute ethyl alcohol, then adding a naphthol and heating the mixture with beta:beta'-dichloro-diethyl ether on a water bath. When the reaction is complete, the unreacted salt is filtered off, washed with a little alcohol and the filtrate distilled to recover the product.

A process of the character above described leaves much to be desired from the standpoint of commercial operation on account of the high cost of organic solvents and the hazards of handling inflammable organic liquids such as ethyl alcohol. Furthermore, such a process is undesirable since it involves difficulties in the isolation of the condensation products and the recovery of the unchanged naphthol employed as a starting material, as well as recovery of the organic solvent.

This invention has as an object the synthesis of polynaphthyl ethers by a simplified process. Another object is to produce naphthyl ethers of good purity and in good yield by a method which may be conveniently operated on a large scale and is more economical than previously proposed processes. A further object is the production of naphthyl ethers by a process which avoids the hazards accompanying the handling of inflammable organic liquids such as ethyl alcohol. A still further object is the provision of a new and improved process for the production of naphthyl ethers characterized by the fact that the isolation of the products and the recovery of unchanged starting materials is more readily effected than in previously known processes. Other objects will appear hereinafter.

These objects are accomplished according to the present invention whereby polynaphthyl ethers are produced by heating together a metallic salt of a naphthol and a poly-halogenated aliphatic hydrocarbon or a poly-halogenated aliphatic hydrocarbon ether in water. By carrying out the reaction in water rather than in an organic solvent, it has been found that the naphthyl ethers may be produced in good purity and in high yields and that the isolation of the products and unchanged raw materials is greatly facilitated.

The manner of carrying out the process may be as follows:

A metal salt of a naphthol, such as, for example, alpha- or beta-naphthol, of the formula:

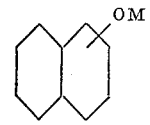

M representing a metal, is prepared by well-known methods. To a solution and/or suspension of this salt in water is added a halogenated aliphatic hydrocarbon or ether of the general formula $A-X_n$, in which X represents a halogen, and A represents an aliphatic hydrocarbon radical or an aliphatic hydrocarbon ether radical, and $n$ represents an integer larger than one. The mixture is heated, giving rise to the following reaction:

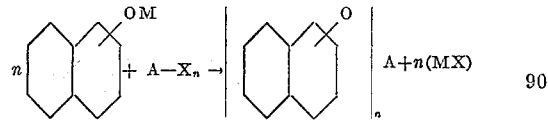

When the condensation is complete, the reaction mass is cooled and the insoluble naphthyl ether is isolated by filtration. It may be purified by any suitable procedure.

The invention will be further understood but is not limited by the following examples, in which the parts are by weight.

Example I

One hundred sixty parts of sodium hydroxide were dissolved in 600 parts of water. Five hundred seventy-six parts of beta-naphthol were added and the material cooled to room temperature. One hundred ninety-eight parts of 1:2-dichloro-ethane were added. The mixture was charged into an autoclave fitted with agitation, and heated at 120° C. for eight hours. When condensation was complete, the reaction mass was made distinctly alkaline with sodium hydroxide solution (to retain unchanged beta-naphthol in solution as the sodium salt) and the precipitated crude product filtered at 70° C. The filter cake was washed with dilute sodium hydroxide solution until free from beta-naphthol and salt, then with water. About 410 parts of crude product were obtained. This material was dried, then purified by crystallization from 4100 parts of xylene. A yield of approximately 350 parts of pure product was thus obtained. The product, ethylene-glycol-di-beta-naphthyl-ether, of the formula:

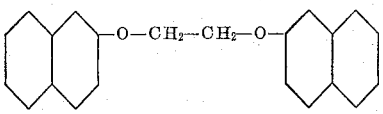

is a white crystalline solid melting, when pure, at 217° C.

The filtrate from the crude product was acidified with sulfuric acid, precipitating about 170 parts of unchanged beta-naphthol. This material was filtered, washed and used in subsequent synthesis of this ether.

Example II

The process of Example I was carried out, except that 376 parts of 1:2-dibrom-ethane were substituted for the 198 parts of 1:2-dichlor-ethane. The product obtained was identical with that obtained in Example I.

Example III

The process of Example I was carried out, except that 286 parts of beta:beta'-dichloro-diethyl ether were substituted for the 198 parts of 1:2-dichlor-ethane. The product was obtained of the formula:

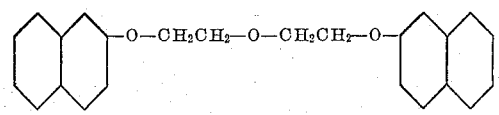

as a white crystalline material, insoluble in water but soluble in hot toluene. The pure product melted at 122° C.

Example IV

The procedure of Example I was followed, except that 226 parts of 1:2-dichloro-propane were substituted for the 198 parts of 1:2-dichloro-ethane. The product obtained was a white crystalline material of the formula:

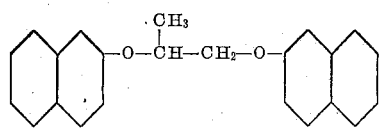

which, when purified, melted at 152° C.

Example V

The process of Example I was followed except that 576 parts of alpha-naphthol were substituted for the 576 parts of beta-naphthol. The white crystalline material obtained melted at 127.5° C., when purified. Its formula is as follows:

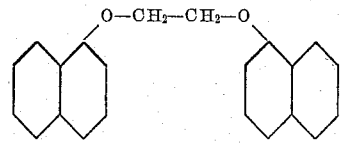

Example VI

The procedure of Example I was carried out except that 286 parts of beta:beta'-dichloro-diethyl ether were substituted for the 198 parts of 1:2-dichloro-ethane and 576 parts of alpha-naphthol were substituted for the 576 parts of beta-naphthol. The white crystalline compound of the formula:

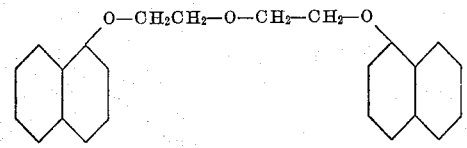

thus obtained melted, when pure, at 87° C.

Example VII

The process of Example I was followed except that 404 parts of trimethylene-bromide were substituted for the 198 parts of 1:2-dichloro-ethane. The white crystalline compound of the formula:

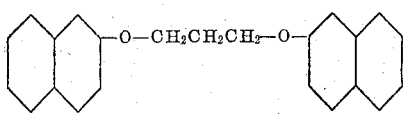

thus obtained melted at 147° C. when purified.

Example VIII

The procedure described in Example I was carried out except that 340 parts of gamma:gamma'-dichloro-dipropyl ether were substituted for the 198 parts of 1:2-dichloro-ethane. The white crystalline compound of the formula:

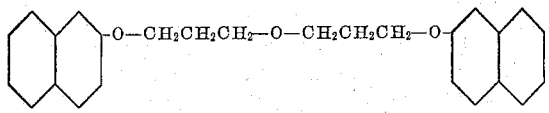

thus obtained melted at 136° C. when purified.

According to procedures similar to those described in the examples, a large number of poly-naphthyl ethers may be prepared. The nature of the starting materials and the exact method of procedure may vary widely. Substituted naphthols, preferably containing substituents such as alkyl (methyl, ethyl, isopropyl, butyl and higher alkyl radicals), alkoxy (methoxy, ethoxy, butyloxy and higher alkoxy radicals) and halogens (e. g., chlorine and bromine), may similarly be reacted with poly-halogenated aliphatic hydrocarbons or poly-halogenated aliphatic hydrocarbon ethers to produce the poly-naphthyl ethers. It will be understood, therefore, that the examples are merely illustrative and not limitative.

Instead of the sodium salts of naphthols, a large number of other salts may be used. Specific examples are the potassium, calcium, copper and lead salts of alpha- or beta-naphthol.

Similar condensations may be carried out with halogenated hydrocarbons or hydrocarbon ethers containing more than two halogen atoms. Examples of such materials are 1:2:3-tribromo-propane, 1:2:3:4-tetrachlorobutane and beta:gamma:beta':gamma'-tetrachloro-dipropyl ether. Further, the halogenated aliphatic ethers may contain more than one oxygen atom. As a specific example of such a reaction may be mentioned the condensation of sodium-beta-naphtholate with ethylene-glycol-di(beta-chloro-ethyl)-ether $$(ClCH_2CH_2OCH_2CH_2OCH_2CH_2Cl)$$

by a process similar to those described above, whereby the di-beta-naphthyl-ether of triethylene-glycol may be obtained.

The concentrations of the reacting materials in the reaction mixture, the temperature of condensation, the time of condensation and the rate of agitation are subject to variation, depending largely upon the nature of the specific reaction involved. Temperatures within the range of about 90° C. to about 150° C. are preferably employed, it being understood, however, that higher or lower temperatures may be used. The various reactions are preferably effected by the use of a water-soluble naphtholate in the presence of sufficient water for solution. After the condensation is complete, any naphthol present may ordinarily be retained in solution by the addition of an alkali adapted to form a water-soluble naphtholate. The poly-naphthyl ethers are normally insoluble and are, therefore, readily separated by filtration.

The crude products may be purified by crystallization from the solvent with selection of the solvent being based upon the best purification obtainable with a minimum loss of the product and solvent.

The products are very useful in the production of dyes, and for other purposes. The process of the invention provides many advantages and overcomes certain disadvantages of previously known processes. The products are obtained in a good state of purity and in relatively high yields. The necessity for the recovery of solvents and the hazards attending the use of organic solvents such as ethyl alcohol are avoided. In particular, the process of the invention is advantageous in that the products obtained are normally insoluble in water and are, therefore, easily separated by filtration in contrast with processes in which organic solvents are employed and distillation is resorted to for recovery of the products. Furthermore, the recovery of unchanged naphthols, which are expensive raw materials, is much more readily effected in the absence of organic solvents.

As many apparently widely different embodiments of this invention may be made without departing from the spirit and scope thereof, it is to be understood that we do not limit ourselves to the specific embodiments thereof except as defined in the appended claims.

We claim:

1. The process of producing poly-naphthyl ethers which comprises heating together in water a naphtholate and a compound selected from the group consisting of poly-halogenated aliphatic hydrocarbons and poly-halogenated aliphatic hydrocarbon ethers.

2. The process of producing a product having the formula:

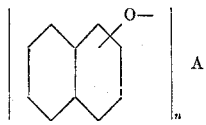

which comprises reacting together in water a compound having the formula:

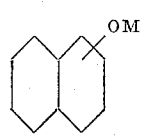

M representing a metal, with a compound having the formula A—X$_n$, in which X represents a halogen, A represents an aliphatic hydrocarbon radical, and $n$ represents an integer larger than one.

3. The process of producing a product having the formula:

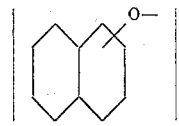

which comprises reacting together in water a compound having the formula:

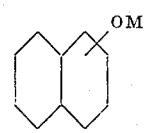

M representing a metal, with a compound having the formula A—X$_n$, in which X represents a halogen, A represents an aliphatic hydrocarbon ether radical, and $n$ represents an integer larger than one.

4. The process of producing a product having the formula:

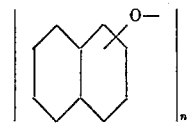

which comprises reacting together in water a compound having the formula:

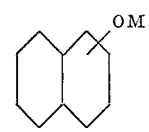

M representing an alkali metal, with a compound having the formula A—X$_n$, in which X represents chlorine, A represents an aliphatic hydrocarbon radical, and $n$ represents an integer larger than one.

5. The process of producing a product having the formula:

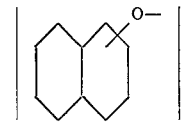

which comprises reacting together in water a compound having the formula:

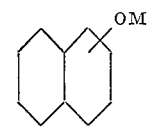

M representing an alkali metal, with a compound having the formula A—X$_n$, in which X represents chlorine, A represents an aliphatic hydrocarbon ether radical, and $n$ represents an integer larger than one.

6. The process of producing ethylene-glycol-di-(beta-naphthyl)-ether which comprises heating together in water a metallic salt of beta-naphthol and a 1:2-dihalo-ethane.

7. The process of producing ethylene-glycol-di-(beta-naphthyl)-ether which comprises heating together in water the sodium salt of beta-naphthol and 1:2-dichloro-ethane.

8. The process of producing a product having the general formula:

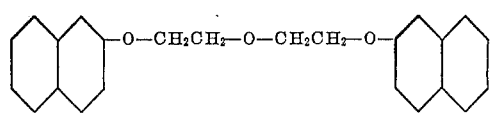

which comprises heating together in water a metallic salt of beta-naphthol and beta:beta'-dichloro-diethyl ether.

9. The process of producing a product having the general formula:

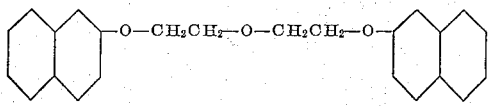

which comprises heating together in water the sodium salt of beta-naphthol and beta:beta'-dichloro-diethyl ether.

10. The process of producing ethylene-glycol-di-(beta-naphthyl)-ether which comprises heating an aqueous solution of the sodium salt of beta-naphthol with 1:2-dichloro-ethane at a temperature of about 120° C., making the resultant product alkaline with sodium hydroxide, and filtering the solid product at about 70° C.

11. The process of producing ethylene-glycol-di-(beta-naphthyl)-ether which comprises dissolving about 160 parts of sodium hydroxide in about 600 parts of water, adding about 576 parts of beta-naphthol, cooling to about 20° C., adding about 198 parts of 1:2-dichloro-ethane, heating to about 120° C. for about eight hours, making the resultant mixture alkaline with sodium hydroxide solution, and filtering the solid product at about 70° C.

12. The process of claim 1, in which the reaction is effected at a temperature within the range of about 90° C. to about 150° C.

13. The process of claim 6, in which the reaction is effected at a temperature within the range of about 90° C. to about 150° C.

14. The process of producing ethylene-glycol-di-(beta-naphthyl)-ether which comprises heating together in water 1:2-dichloro-ethane and the sodium salt of beta-naphthol at a temperature of about 120° C.

MILES A. DAHLEN.
CRAYTON K. BLACK.
WILLIAM L. FOOHEY.